(12) United States Patent
Cummings et al.

(10) Patent No.: US 12,810,257 B2
(45) Date of Patent: Nov. 24, 2026

US012810257B2

(54) SANITARY FACILITY MANAGEMENT SYSTEM AND SANITARY FACILITY MANAGEMENT METHOD

(71) Applicants: CAROMA INDUSTRIES LIMITED, Queensland (AU); MICAS AG, Oelsnitz (DE)

(72) Inventors: Stephen John Cummings, New South Wales (AU); Mark Ebert, Oelsnitz/Erzgebirge (DE); Michael Fritzsche, Neukirchen/Erzgebirge (DE)

(73) Assignees: Caroma Industries Limited, Queensland (AU); MICAS AG, Oelsnitz (DE)

(*) Notice: Subject to any disclaimer, the term of this patent is extended or adjusted under 35 U.S.C. 154(b) by 1167 days.

(21) Appl. No.: 17/424,460

(22) PCT Filed: Feb. 17, 2020

(86) PCT No.: PCT/AU2020/050130
§ 371 (c)(1),
(2) Date: Jul. 20, 2021

(87) PCT Pub. No.: WO2020/163922
PCT Pub. Date: Aug. 20, 2020

(65) Prior Publication Data

US 2022/0101278 A1 Mar. 31, 2022

(30) Foreign Application Priority Data

Feb. 15, 2019 (DE) ..................... 10 2019 103 865.0

(51) Int. Cl.
*G06Q 10/30* (2023.01)
*G05B 15/02* (2006.01)
(Continued)

(52) U.S. Cl.
CPC ............. *G06Q 10/30* (2013.01); *G05B 15/02* (2013.01); *G06N 20/00* (2019.01); *G06Q 50/06* (2013.01)

(58) Field of Classification Search
CPC ........ G06Q 10/30; G06Q 50/06; G06Q 50/00; G05B 15/02; G05B 13/029; G06N 20/00; E03B 7/04; E03C 1/00; Y02W 90/00
(Continued)

(56) References Cited

U.S. PATENT DOCUMENTS 11,326,330 B2 * 5/2022 Saruta ................... G01F 23/802
2006/0174707 A1 * 8/2006 Zhang ................ G01N 29/4418 700/282
(Continued)

FOREIGN PATENT DOCUMENTS

KR 10-2016-0078605 A 7/2016
WO 2016/040989 A1 3/2016
(Continued)

OTHER PUBLICATIONS

Larson, Eric Cooper. "Semi-supervised training for infrastructure mediated sensing: disaggregated hot and cold water sensing with minimal calibration." PhD diss., (University of Washington, 2013). (Year: 2013).*

*Primary Examiner* — Brian S Cook
(74) *Attorney, Agent, or Firm* — Seed Intellectual Property Law Group LLP

(57) ABSTRACT

The present invention comprises a sanitary facility management system as well as a corresponding sanitary facility management method with at least one sanitary installation, which is coupled to a water supply and/or is included in a water circuit and on which at least one operating value of the at least one sanitary installation can be recorded, a sanitary facility control device connected to the at least one sanitary installation comprising at least one data transmitter and at
(Continued)

Figure 1:
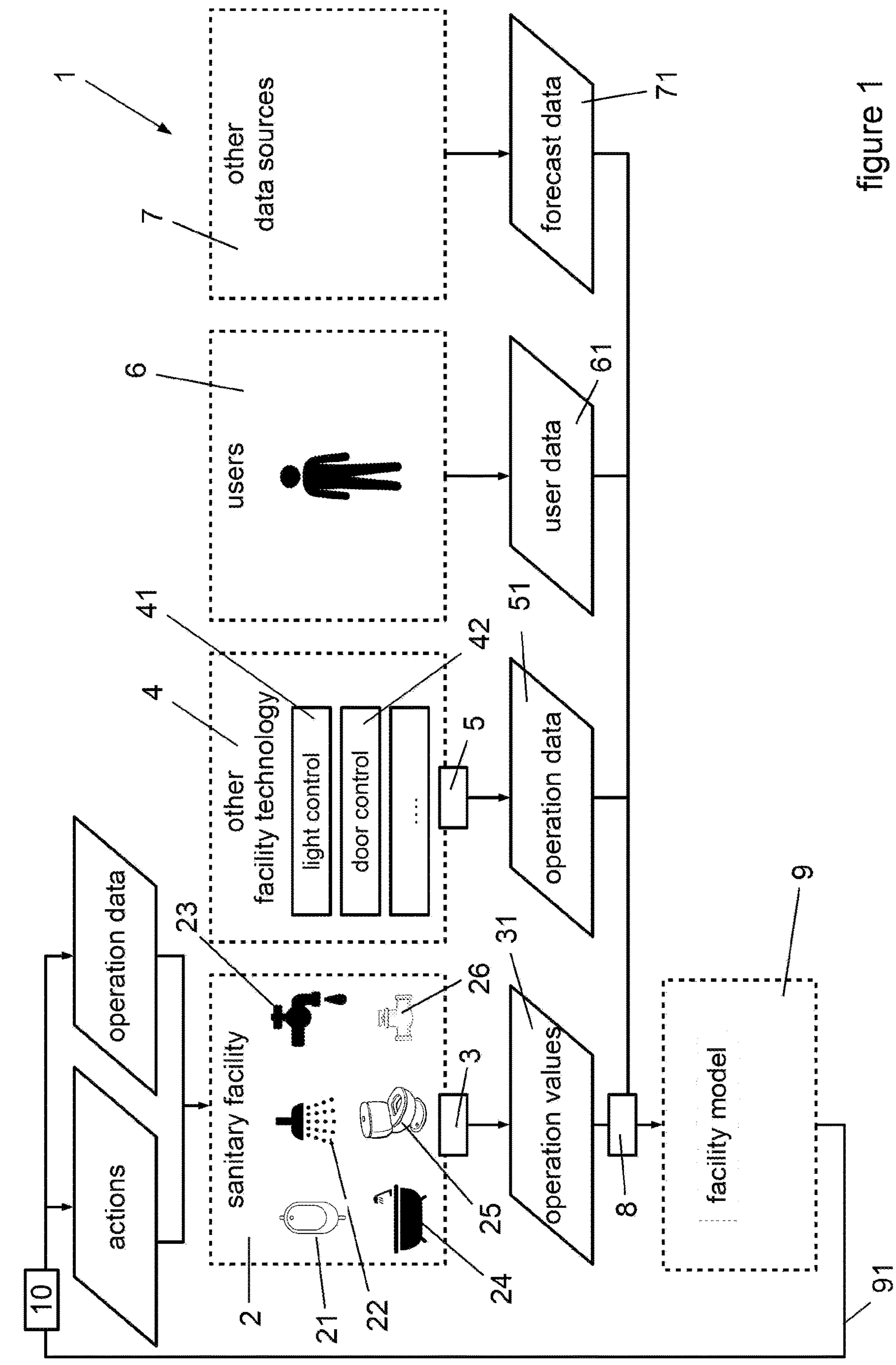

least one signal receiver and a data processing and signal output system communicating with the sanitary facility control device via the at least one data transmitter and the at least one signal receiver, wherein the data processing and signal output system is a system learning by machine and/or a system comprising an artificial neuronal net and/or an expert system.

20 Claims, 9 Drawing Sheets

(51) Int. Cl.

*G06N 20/00* (2019.01)

*G06Q 50/06* (2012.01)

(58) Field of Classification Search

USPC .......................................................... 703/13

See application file for complete search history.

(56) References Cited

U.S. PATENT DOCUMENTS

| | | | | |
|---|---|---|---|---|
| 2008/0001735 | A1 * | 1/2008 | Tran | A61B 5/395<br>340/539.22 |
| 2017/0030528 | A1 | 2/2017 | Dietzen et al. | |
| 2017/0052536 | A1 | 2/2017 | Warner et al. | |
| 2017/0085839 | A1 * | 3/2017 | Valdhorn | G06V 20/52 |
| 2017/0089047 | A1 * | 3/2017 | Kovscek | E03B 7/072 |
| 2018/0143047 | A1 | 5/2018 | Gal | |
| 2018/0302697 | A1 * | 10/2018 | Comfort | G06N 3/02 |
| 2020/0131751 | A1 * | 4/2020 | Herbert | C02F 1/46104 |
| 2023/0175242 | A1 * | 6/2023 | Grody | E03D 1/00<br>700/282 |

FOREIGN PATENT DOCUMENTS

| | | | |
|---|---|---|---|
| WO | 2018/061015 | A2 | 4/2018 |
| WO | 2018/096456 | A1 | 5/2018 |

* cited by examiner

SANITARY FACILITY MANAGEMENT SYSTEM AND SANITARY FACILITY MANAGEMENT METHOD

The present invention relates to a sanitary facility management system with at least one sanitary installation, which is coupled to a water supply and/or included in a water circuit and on which at least one operating value of the at least one sanitary installation can be recorded, a sanitary facility control device connected to the at least one sanitary installation comprising at least one data transmitter and at least one signal receiver and a data processing and signal output system communicating with the sanitary facility control device via the at least one data transmitter and the at least one signal receiver. The invention furthermore relates to a sanitary facility management method in which on a sanitary facility with at least one sanitary installation, which is supplied with water and/or through which water flows, and on which during one process cycle at least one operating value of the at least one sanitary installation is recorded, the at least one operating value is transmitted to a data processing and signal output system by at least one data transmitter of a sanitary facility control device connected to the at least one sanitary installation, the data processing and signal output system processes the at least one operating value, generates at least one signal in accordance therewith and transmits the at least one signal to the at least one signal receiver of the sanitary facility control device.

A sanitary facility management system and sanitary facility management method of this type are known from the document WO 2016/040989 A1. Here, operating values associated with an operating parameter, for example of water consumption installations of a bathroom, such as a toilet, a urinal, a washbasin tap and a bathtub, are recorded. The operating values associated with the operating parameter are then transmitted by an electronic control device of the water consumption installation to a data processing unit, such as a computer. In the data processing unit, operating parameters are stored, which are compared to the transmitted operating values, in order to be able to determine whether the respective water consumption installation is working correctly. Based on the transmitted operating values, the data processing unit thereupon calculates control data and sends them to the electronic control device of the water consumption installation. Based on these control data, the respective operating parameter of the water consumption installation is then changed or not changed by the electronic control device.

The known system and the known method primarily serve for reducing the water consumption of sanitary facilities. For making the decision what to do and not to do in the individual case, there is however the need for at least one person, who evaluates statistics and for example decides, how to reduce the water consumption of a sanitary device at times of high usage, when to activate a cleaning mode or to initiate a service call. Particularly with larger sanitary facilities, this involves great effort which is hardly feasible, so that the resources which are generally available in a sanitary facility, for example with regard to water saving, cannot be used with the previous system and the corresponding method.

It is therefore the object of the present invention to advance the system and the method of that type in such a way that the efficiency regarding the water consumption of a sanitary facility can be further increased with the same or even less effort.

This object is solved on the one hand by a sanitary facility management system with at least one sanitary installation, which is coupled to a water supply and/or is included in a water circuit and on which at least one operating value of the at least one sanitary installation can be recorded, a sanitary facility control device connected to the at least one sanitary installation comprising a data transmitter and a signal receiver and a data processing and signal output system communicating with the sanitary facility control device via the data transmitter and the signal receiver, wherein the data processing and signal output system is a system learning by machine and/or a system comprising an artificial neuronal net and/or an expert system.

Preferably, the data processing and signal output system comprises at least one regulation and/or a classifier trained with methods of artificial intelligence.

The sanitary facility management system according to the invention can comprise a system as a data processing and signal output system that is machine learning or self-learning. The machine learning of the data processing and signal output system used according to the invention can take place supervised (described as supervised learning in English), wherein the data processing and signal output system is trained with pre-defined data, and/or it can take place unsupervised (described as unsupervised learning in English), wherein the data processing and signal output system continuously learns based on the transferred data during operation, and/or it can take place reinforced (described as reinforcement learning in English), wherein the data processing and signal output system receives a feedback or response from at least one other part and/or at least one user of the sanitary facility management system, whether the learning has led to a success. Such a success can for example occur if a change carried out in the settings of the sanitary facility management system has reduced a water consumption of the sanitary facility management system. The sanitary facility management system can for example learn supervised in a startup mode, and can learn unsupervised or reinforced in a subsequent operating mode for refining and/or optimizing what has already been learned.

Accordingly, the data processing and signal output system of the sanitary facility management system according to the invention can build on previous experiences of the sanitary facility management system, whereby the quality and efficiency of the sanitary facility management system is increased the longer it is operating. Alternatively or in addition thereto, the sanitary facility management system according to the invention can comprise a system comprising an artificial neuronal net. Such a system can for example comprise at least one regulation and/or a classifier trained with methods of artificial intelligence. The sanitary facility management system according to the invention can furthermore comprise an expert system. An expert system is a computer program which makes decisions based on a knowledge base. In all of these cases, the sanitary facility management system according to the invention can make decisions even faster than this could be done by a person. When using the sanitary facility management system according to the invention, errors can furthermore be immediately recognized and prevented.

The sanitary facility management system according to the invention uses methods of artificial intelligence in order to analyze the data transmitted to the data processing and signal output system and, based thereon, return improved signals to the sanitary facility control device. The improved signals are used for controlling at least one function or action of the at least one sanitary installation by the sanitary facility control device and thus lead to an improved setting of the respective sanitary installation. As a result of this optimized setting on the sanitary installation, improved operating values are measured thereon and/or damages are quickly detected or prevented and/or water consumptions are reduced and/or peak times are predicted based on historical usage data.

The sanitary facility management system according to the invention can comprise varying communication structures. In preferable embodiments of the sanitary facility management system according to the invention, the data processing and signal output system is thereby either a computer or a mobile device with computer functionality and connectivity or an IT infrastructure available via the internet or a facility management system. As a computer, a PC or a tablet can for example be considered. As a mobile device with computer functionality and connectivity, a smartphone may be used. An IT infrastructure available via the internet can for example be provided by a cloud. Depending on the embodiment of the sanitary management facility system according to the invention, the basic sensor can communicate via the data transmitter either directly with the computer or with the smartphone or with the cloud or with the facility management system accordingly. Vice versa, a direct communication can take place between the computer and the signal receiver and thus the sanitary facility control device, or between the smartphone and the signal receiver and thus the sanitary facility control device, or between the cloud and the signal receiver and thus the sanitary facility control device, or between the facility management system and the signal receiver and thus the sanitary facility control device.

In specific variants of the sanitary facility management system according to the invention, a data and/or signal intermediate processing device is provided between the data transmitter and the data processing and signal output system and/or between the signal receiver and the data processing and signal output system. As a data and/or signal intermediate processing device, a gateway can for example be used. Accordingly, the at least one sanitary installation and/or at least one basic sensor recording operating values of the sanitary installation provided thereon, can communicate with the computer or the smartphone or the cloud or the facility management system via the data transmitter and the gateway. Vice versa, the communication between the computer or the smartphone or the cloud or the facility management system with the sanitary facility control device can take place via the gateway and the signal receiver.

With these embodiments of the invention, a central unit for analysis and/or decision is used with the computer or the smartphone or the cloud or the facility management system.

In further embodiments of the sanitary facility management system according to the invention, the data processing and signal output system is formed as a meshed network comprising at least one basic sensor or one electronic control of one of the sanitary installations and at least one network sensor communicating with the at least one basic sensor or one electronic control of another of the sanitary installations. A meshed network is also referred to as a mesh network. A wireless network such as a Bluetooth mesh can for example be used here. The network sensor can be a basic sensor, too. In these embodiments of the sanitary facility management system according to the invention, a decentralized system is used in which the basic sensors and the network sensors communicate directly among each other and decisions can be made in the net (mesh). That means, one of the basic sensors or one of the network sensors can make decisions based on the operating data captured by other basic sensors or network sensors situated in the net.

The object is furthermore solved by a sanitary facility management method in which at least one operating value of the at least one sanitary installation is recorded at a sanitary facility with at least one sanitary installation, which is supplied with water and/or through which water flows, the at least one operating value is transmitted to a data processing and signal output system with a data transmitter of a sanitary facility control device connected to the at least one sanitary installation, the data processing and signal output system processes the at least one operating value, at least one signal is generated in accordance therewith and the at least one signal is transmitted to a signal receiver of the sanitary facility control device, and in which the data processing and signal output system learns by machine and/or generates the at least one signal by using an artificial neuronal net and/or an expert system.

The machine learning of the data processing and signal output system can take place supervised (supervised learning), wherein the data processing and signal output system is trained with pre-defined data, and/or it can take place unsupervised (unsupervised learning), wherein the data processing and signal output system continuously learns during operation based on the transmitted data, and/or it can take place reinforced (reinforcement learning), wherein the data processing and signal output system receives a feedback or response of at least another part and/or at least one user of the sanitary facility management system, whether the learning has led to a success.

In preferable embodiments of the method according to the invention, it works based on an artificial neuronal net. An expert system, that is a computer program which makes decisions based on a knowledge base, can be used alternatively or in addition thereto with the method according to the invention.

It is preferably in one process cycle that the data transmitted in the process cycle preceding the respective current one and the at least one signal generated in accordance therewith are analyzed, at least one rule and/or one algorithm for an optimization of the at least one operating value of the at least one sanitary installation is deduced therefrom, depending on the currently transmitted data and the at least one rule and/or the at least one algorithm, the at least one signal is generated as a current signal, and that current signal is transmitted to the signal receiver with the method according to the invention. This approach preferably takes place in each process cycle. However, it can also take place time-driven, event-driven and/or user-driven.

In the present invention, one process cycle is meant to be a cycle, in which data are recorded of the at least one sanitary installation optionally furnished with at least one basic sensor, and possible present data of other sensors are recorded, and, if necessary, at least one signal, for example for changing settings on the sanitary device, is generated. With the sanitary facility management method according to the invention, the data of the sensors can for example only be read or recorded in specific time intervals, for example time intervals of 15 minutes. Generating the at least one signal and thus changing the settings on the sanitary device can, however, take place far less often, namely only if needed.

The data processing and signal output system can alternatively or additionally generate the at least one signal based on at least one regulation and/or classifier trained with methods of artificial intelligence. The regulation and/or the classifier can be trained outside of the data processing and signal output system, for example by using real data but at laboratory conditions. The regulation and/or the classifier can be firmly integrated into the data processing and signal output system without a continuous optimization of the regulation and/or the classifier taking place. Such a classifier can for example be a neuronal network.

With the sanitary facility management method according to the invention, the data processing and signal output system is learning by machine. Thereby, it can analyze and make decisions more quickly and more reliably than is possible by a person.

Preferably, the data processing and signal output system learns by machine at least one usage scenario for the at least one sanitary installation from the data transmitted by the data transmitter and signals transmitted to the signal receiver as well as from the at least one rule and/or the at least one algorithm deduced therefrom and optimizes the corresponding current signal in accordance with the at least one usage scenario.

According to that option of the invention, the data processing and signal output system learns typical usage scenarios on basis of which settings on the at least one sanitary installation are optimized, deviations in their function are recognized, etc.

Thereby, it is advantageous if the data processing and signal output system automatically adjusts the at least one usage scenario with due regard to each process cycle.

Due to this ongoing optimization, previously acquired knowledge of the sanitary facility management system can be optimized based on its real usage. It has also proven to be advantageous if the data processing and signal output system automatically predicts future operating values to be expected by the data transmitter based on the at least one usage scenario.

According to that option of the invention, forecasts can be made in the sanitary facility management method according to the invention, which enable an anticipatory initiation of actions on and/or controlling of the at least one sanitary installation. Based on acquired usage scenarios, different behavioral patterns and/or usage profiles of users of the at least one sanitary installation can also be predicted.

In one embodiment of the sanitary facility management method according to the invention, it is furthermore provided that the data processing and signal output system automatically groups the data transferred by the data transmitter into correct and error indicating data compared to the at least one rule and/or the at least one algorithm and/or the at least one usage scenario. Hereby, the sanitary facility management method according to the invention can use neuronal nets. Thereby, it is possible for the sanitary facility management system according to the invention to enter typical correct and faulty operation states of the at least one sanitary installation and/or to recognize errors thereon.

In the event of error indicating data, the data processing and signal output system (a) initiates an action on the sanitary installation or its water supply and/or (b) issues an assistance message and/or a notification.

It is also advantageous if a modeling is carried out in the sanitary facility management method according to the invention. Hereby, the sanitary facility management system forms a model of the sanitary facility which includes the performance of all components and influences of the sanitary facility as well as their interactions. Such interactions can for example be interactions between the sanitary facility and the water supply, between the sanitary facility and other water consumers, between the sanitary facility and other facility technology or between the sanitary facility and users of the sanitary facility or interactions with data from other data sources. The generated model serves for identifying typical scenarios and/or for forecasting purposes. Based on a usage scenario acquired by the data processing and signal output system and the identification of a high user frequency from the data transmitted to the data processing and signal output system, for example during an intermission of an event, settings on the sanitary facility during the respective time frame, that is the intermission, can for example be adjusted.

Preferably, the sanitary facility management method according to the invention proceeds in such a way that the sanitary facility control actively changes the at least one operating parameter of the at least one sanitary installation after receiving the corresponding at least one current signal from the signal receiver.

The sanitary facility management system according to the invention can thus make autonomous decisions in this embodiment. Accordingly, there is an autonomous operation of the sanitary facility management method according to the invention with this embodiment. Actions and/or optimizations are hereby autonomously carried out by the sanitary facility management system.

In an alternative or additional embodiment of the sanitary facility management method according to the invention, the sanitary facility control issues at least one assistance message after receiving the corresponding at least one current signal from the signal receiver.

In this embodiment, the sanitary facility management system according to the invention issues recommendations, thus acts as an assistance system. Hereby, actions and/or optimizations are proposed to a user or operator of the sanitary facility management system, the decisions are made by the user or operator based thereon.

With the sanitary facility management method according to the invention, the data basis for the decision making is primarily supplied by the at least one sanitary installation and/or the at least one basic sensor provided on the at least one sanitary installation. The at least one sanitary installation and/or the at least one basic sensor for example supply/supplies operating values, that is data relating to water consumption and/or on the number of switch cycles or usages of the at least one sanitary installation.

With the sanitary facility management method according to the invention, data of sensors or controls of other areas of the facility technology as well as other data sources can furthermore be analyzed. In one embodiment of the sanitary facility management method according to the invention, it is therefore provided for the data processing and signal output system to receive external data from at least one additional sensor and/or control not belonging to the sanitary facility and/or from at least one data source not belonging to the sanitary facility, and to incorporate the external data into the deduction of the at least one rule and/or the at least one algorithm and/or the at least one usage scenario.

Such further data sources can for example be door controls. Based thereon, it can for example be identified when people have entered a room or a building, in which the at least one sanitary installation is provided.

Such other data sources can also be light controls. Based thereon, a presence of people in a room or a building, in which the at least one sanitary installation is provided, can also be identified.

The mentioned external data can for example be weather data and/or weather forecast data.

For reading external data, calendars and/or programmes and/or timetables and/or flight schedules and/or class schedules and/or booking plans for example for conference rooms and/or opening hours for example of restaurants, museums, authorities or institutions can be used. These data can be retrieved from a theater and/or a cinema and/or a stadium and/or a train station and/or an airport and/or a school or university or similar institutions.

By analyzing the at least one operating value of the at least one sanitary installation combined with other data from the range of water supply such as pressure and/or temperature and/or water quality, and/or of waste water disposal, such as blockage detection, patterns can be detected, which predict a possible failure. With the sanitary facility management method according to the invention, a preventive service can be initiated on the sanitary facility in such a case and/or settings on the sanitary facility can be made for safe operation.

By analyzing current and historical operation data of the sanitary facility in the sanitary facility management method according to the invention, cleaning cycles can be optimized on the sanitary facility, which leads to saving costs and improving the quality. Forecasts for optimizing specific cleaning times can hereby furthermore be used. Prior to an expected peak time, consumables can for example be filled up. Furthermore, a cleaning can take place after a peak time.

By means of the sanitary facility management method according to the invention, typical scenarios and habits for enhancing the comfort and the user experience can furthermore be used. A shower temperature and/or an illumination can for example be specifically coordinated with the user scenario to be expected.

With the sanitary facility management method according to the invention, it is furthermore possible to use data of users of the at least one sanitary installation. Thereby, certain users can be recognized and/or identified. Such data can for example be biometrical data of the users. However, an identification of the users via data on their smartphone or a specific RFID, for example on the clothing and/or on personal belongings, such as a key ring or a chip card of the respective user, can also take place.

Other external data can result from a user feedback. Thus, an input device for users of the at least one sanitary installation, such as a shut-off valve, can for example be provided on the at least one sanitary installation on which they can confirm these errors or false alarms.

Figure 2:
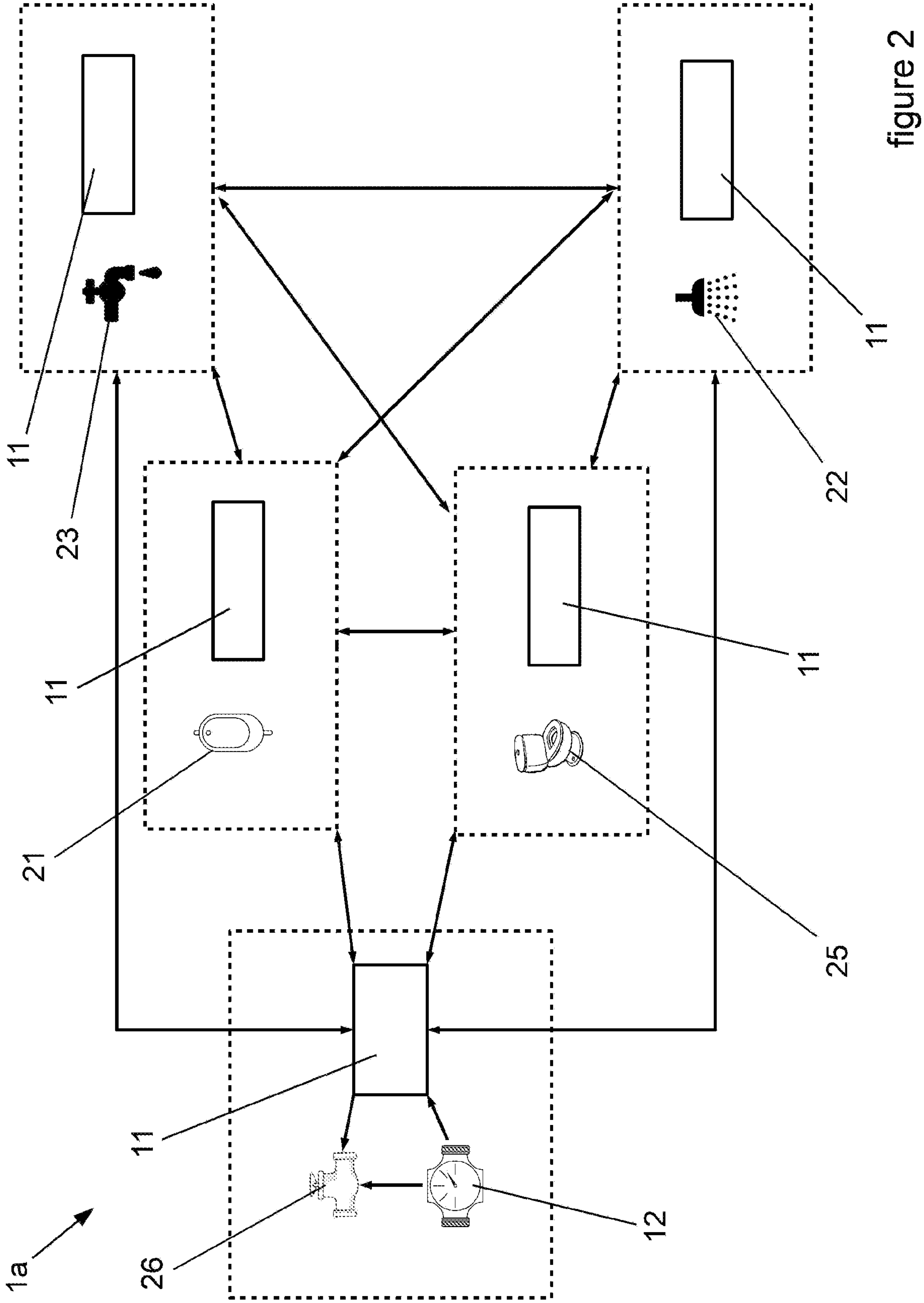
Figure 3:
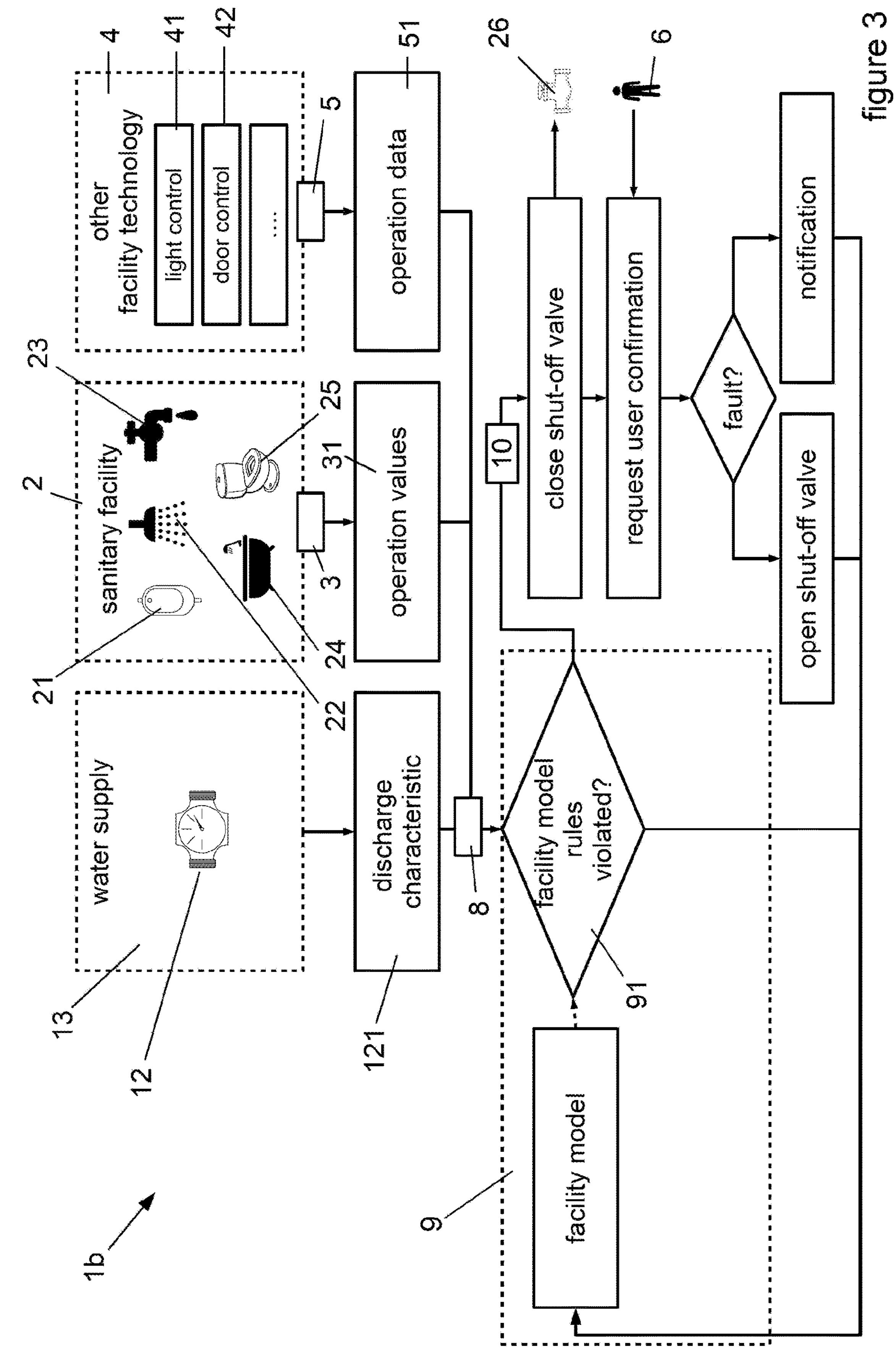
Figure 4:
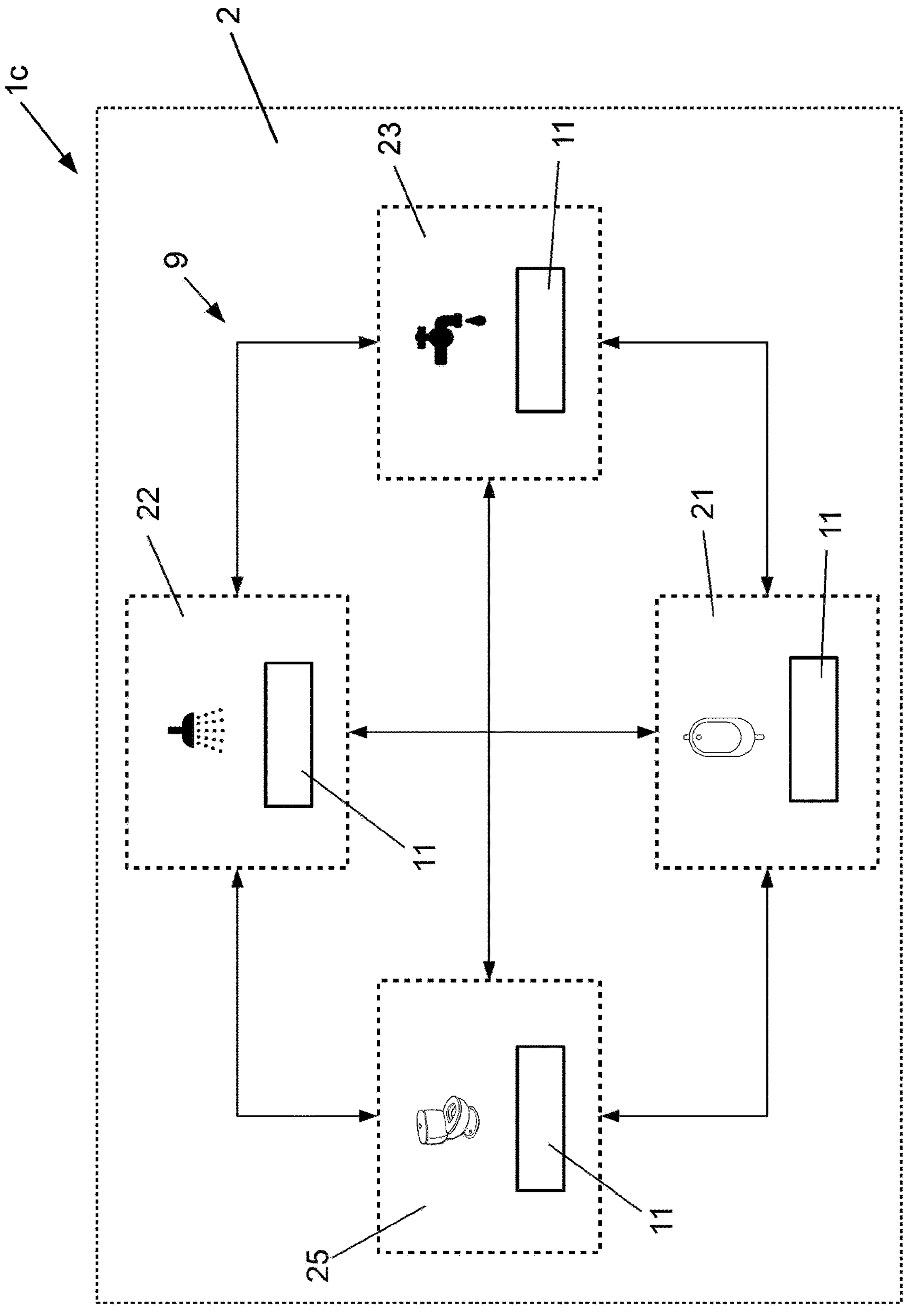
Figure 5:
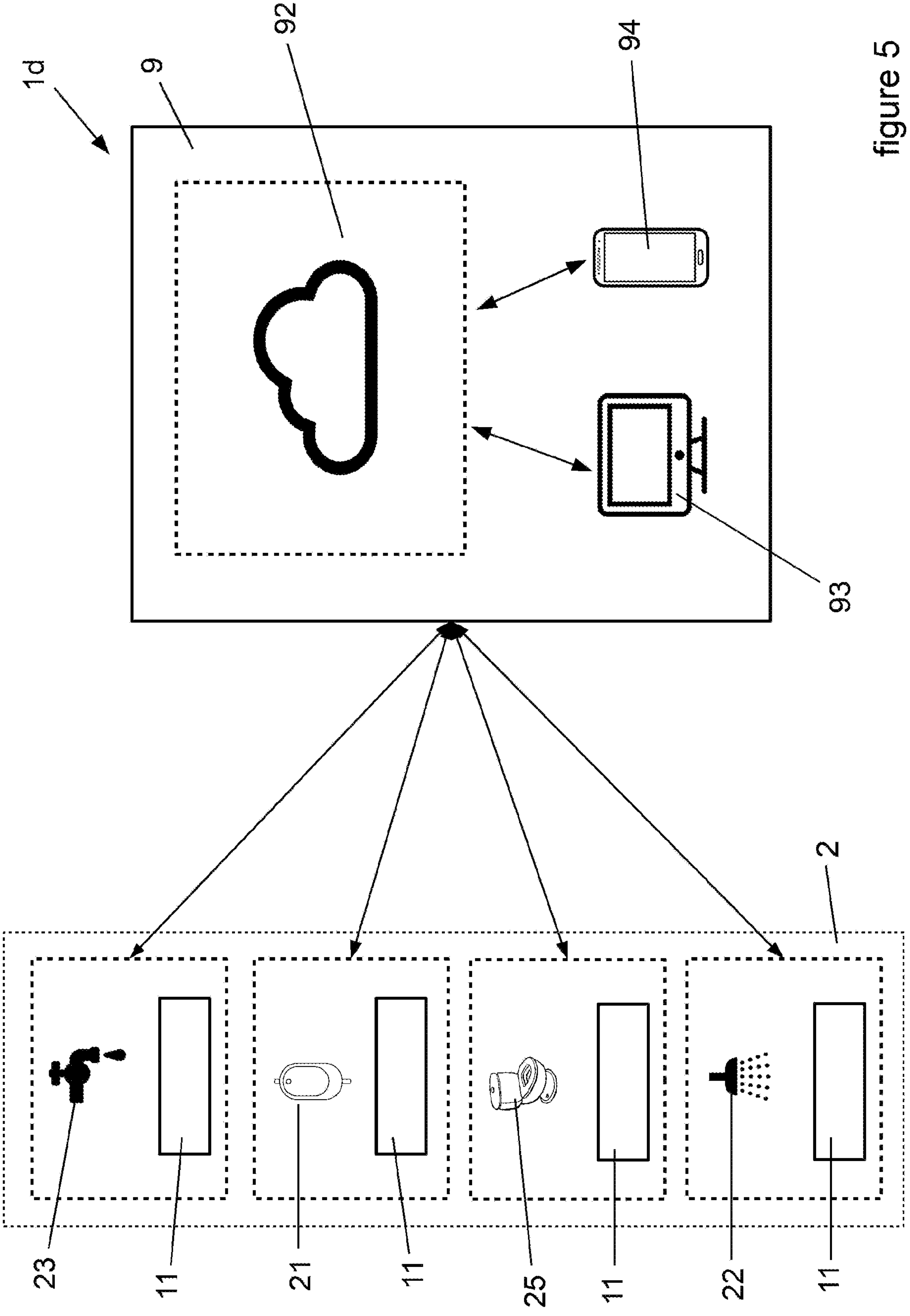
Figure 6:
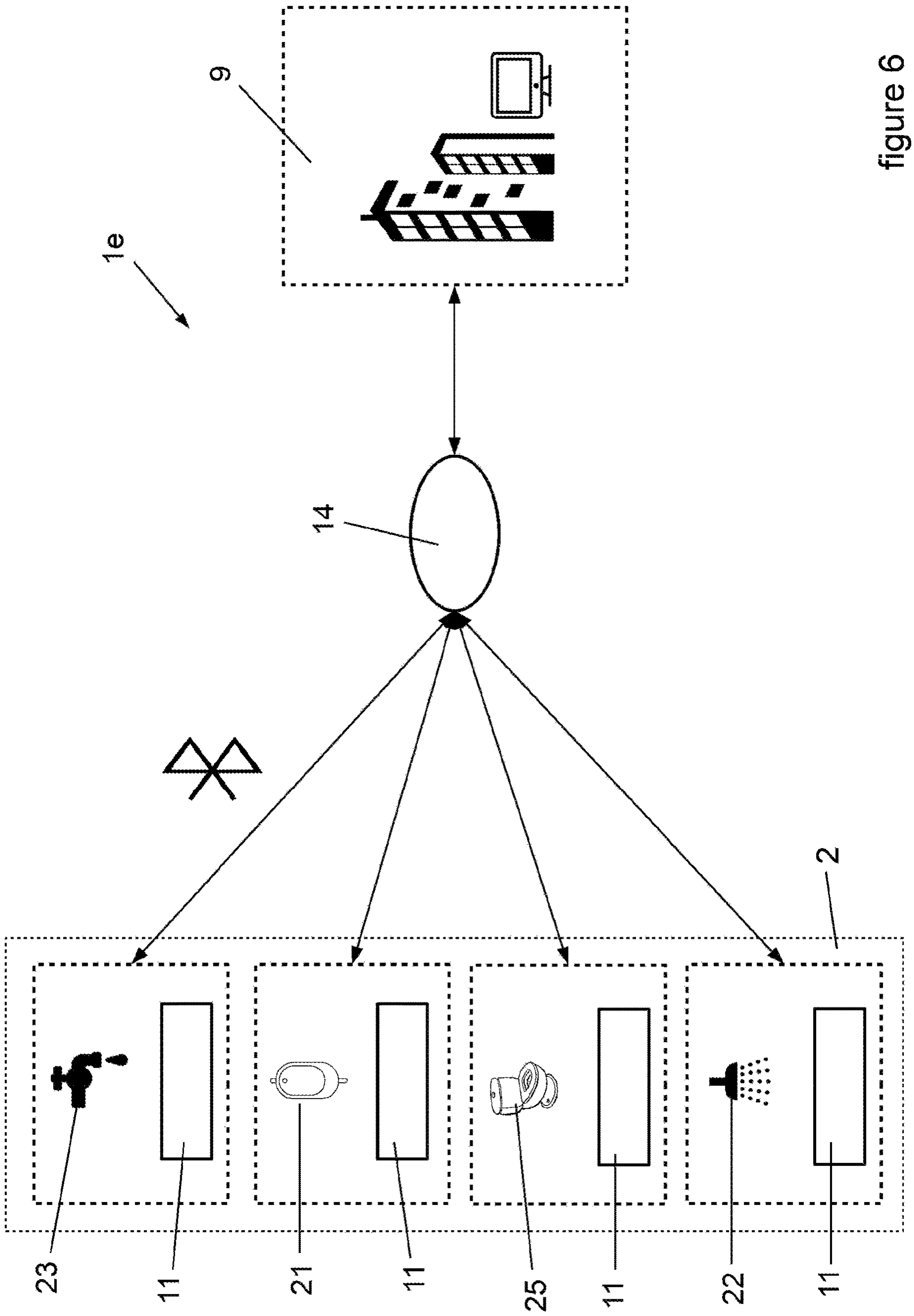
Figure 7:
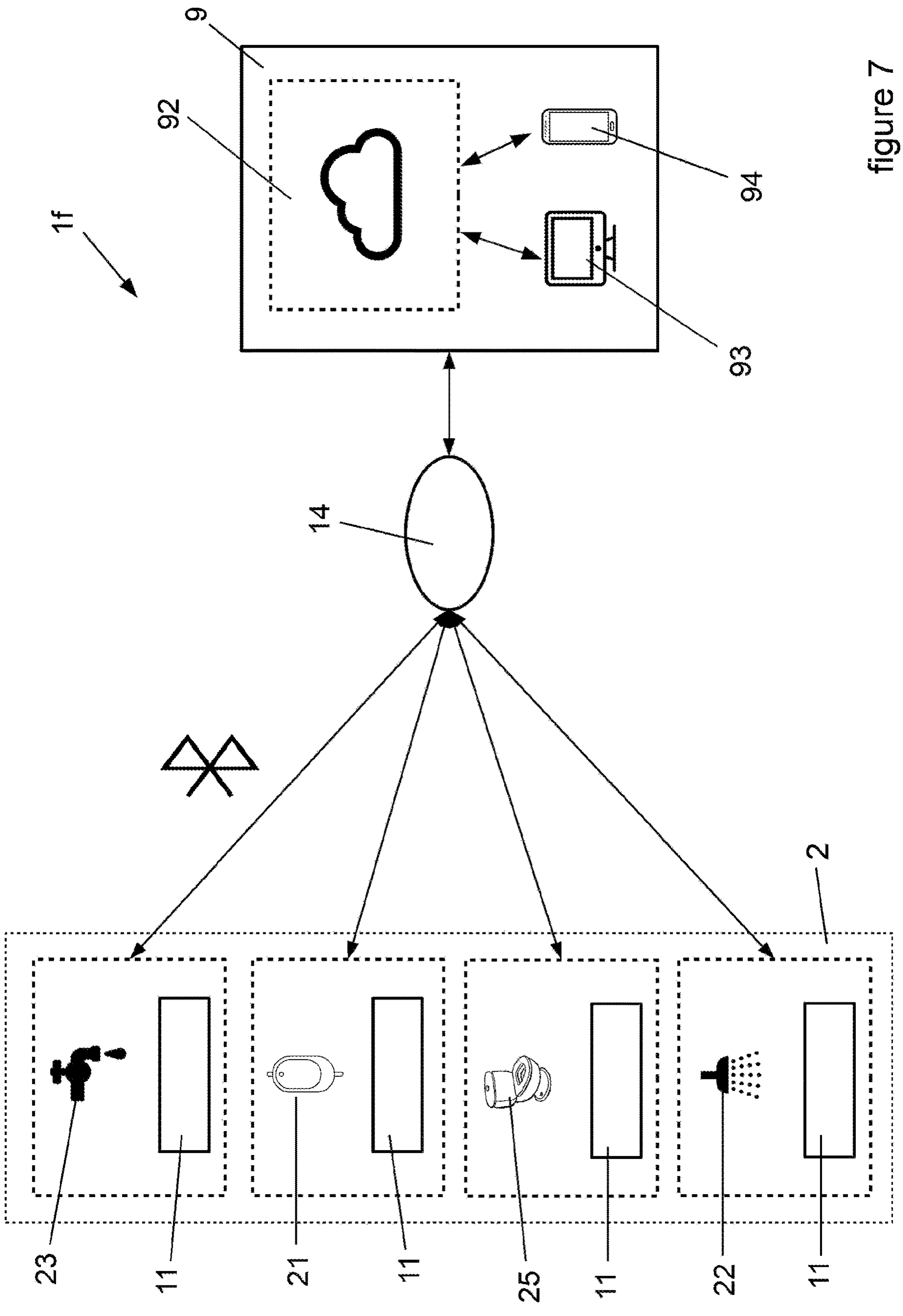
Figure 8:
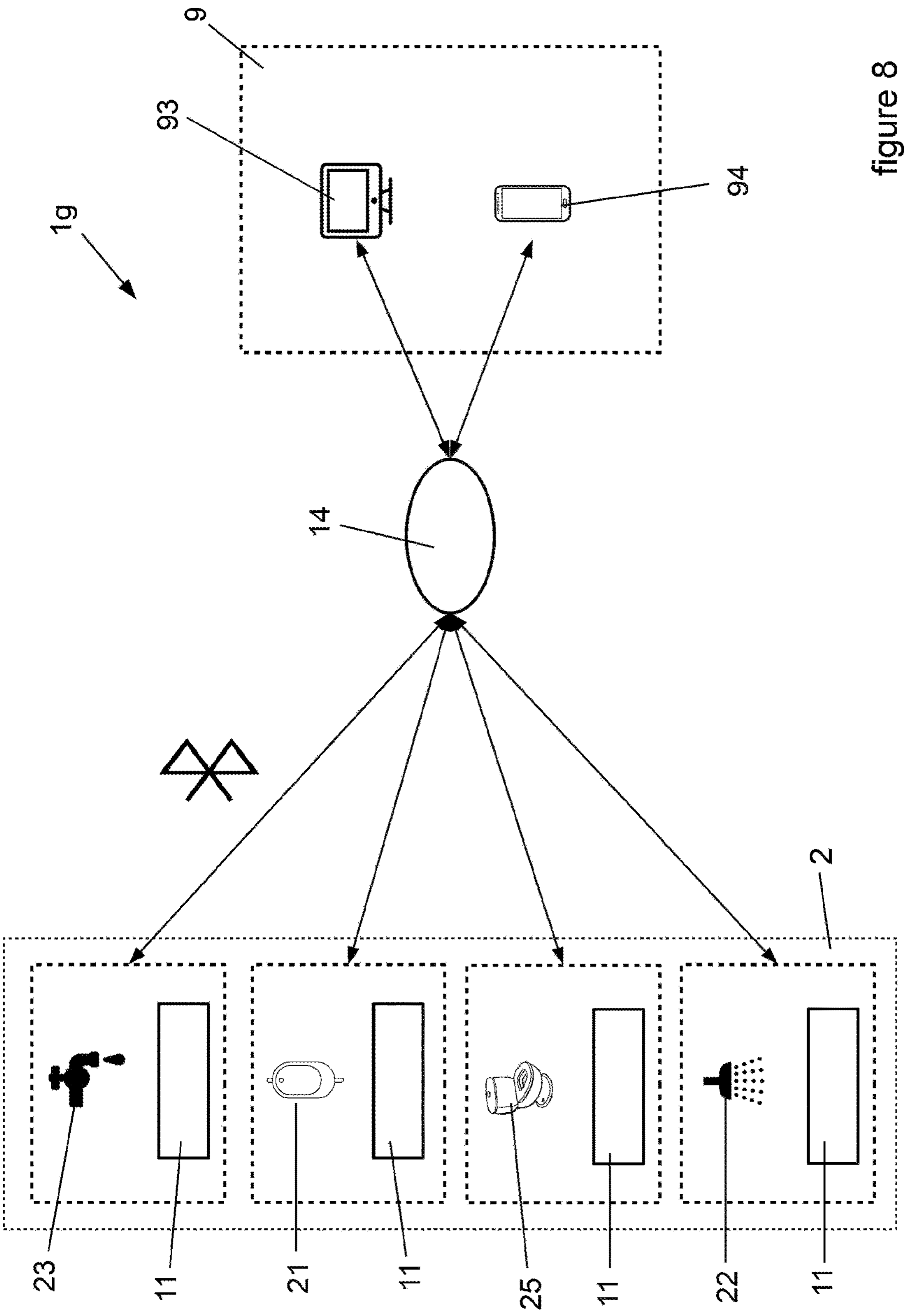
Figure 9:
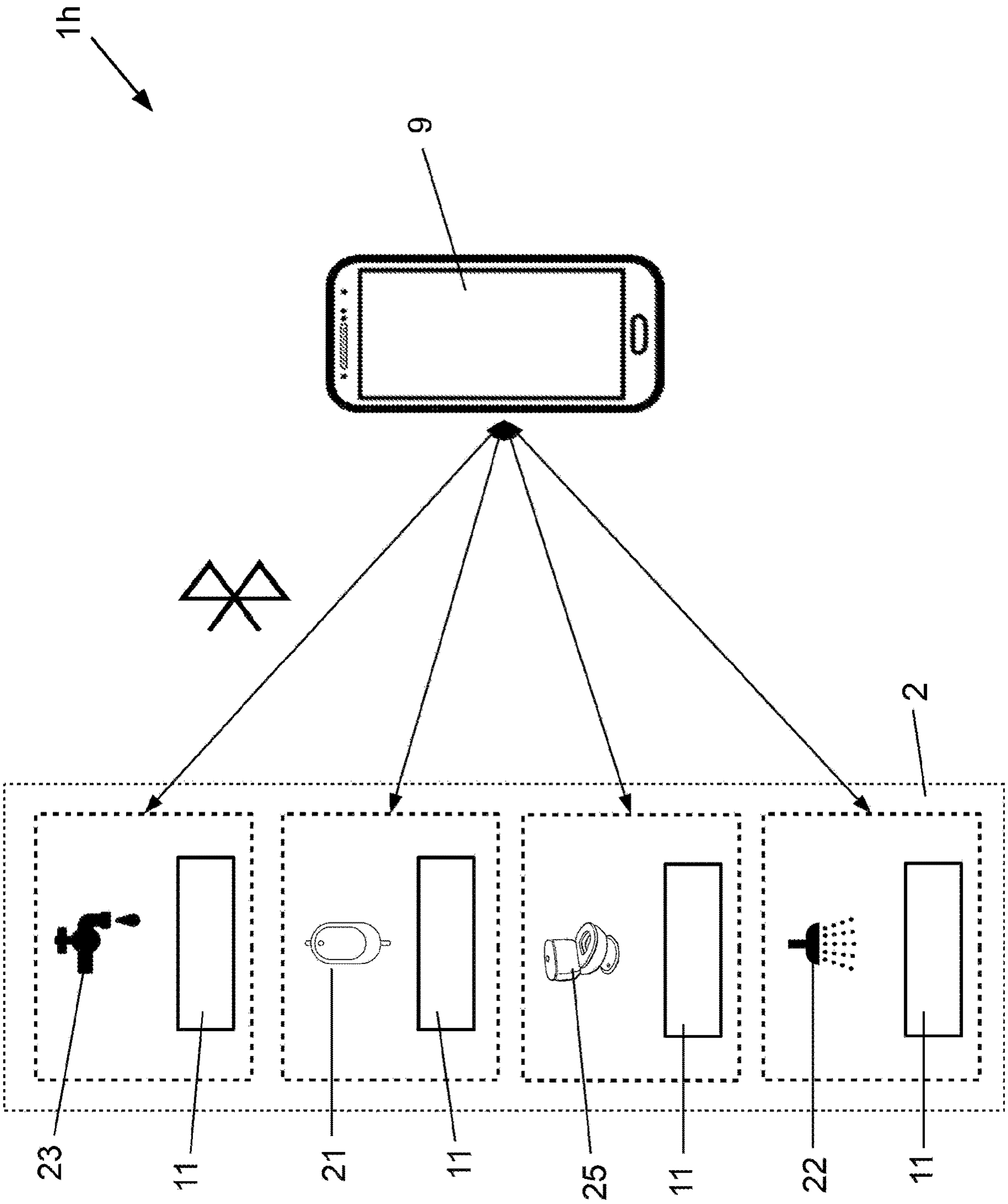

Embodiments of the sanitary facility management system according to the invention, including the respective embodiments of the sanitary facility management method executed by it are explained in more detail in the following figures, wherein FIG. 1 schematically shows a general structure of one embodiment of the sanitary facility management system according to the invention, in which the general process of the corresponding embodiment of the sanitary facility management method according to the invention is indicated as well;

FIG. 2 schematically shows another embodiment of the sanitary facility management system according to the invention, in which it is a leakage protection system based on a meshed communication;

FIG. 3 schematically shows a general process of a sanitary facility management method according to the invention for leakage protection;

FIG. 4 schematically shows a communication structure usable with one embodiment of the sanitary facility management system according to the invention, based on a meshed network;

FIG. 5 schematically shows a communication structure with a cloud usable with one embodiment of the sanitary facility management system according to the invention;

FIG. 6 schematically shows a communication structure with a gateway usable with one embodiment of the sanitary facility management system according to the invention;

FIG. 7 schematically shows a communication structure with a gateway and a data processing and signal output system consisting of a cloud and several devices usable with one embodiment of the sanitary facility management system according to the invention;

FIG. 8 schematically shows a communication structure with a gateway and a data processing and signal output system comprising several devices usable with one embodiment of the sanitary facility management system according to the invention; and FIG. 9 schematically shows a simple communication structure usable with one embodiment of the sanitary facility management system according to the invention.

In FIG. 1, a general process of one embodiment of a sanitary facility management method and the embedment of algorithms of the artificial intelligence in a sanitary facility management system 1 according to the invention, is depicted.

A sanitary facility 2 is the core of the sanitary facility management system 1. The sanitary facility 2 comprises at least one sanitary installation. It is characteristic for the at least one sanitary installation to be coupled to a water supply and/or to be included in a water circuit. The at least one sanitary installation can for example be or comprise at least one urinal 21 and/or at least one shower 22 and/or at least one washbasin tap 23 and/or at least one bathtub 24 and/or at least one toilet 25 and/or at least one shut-off valve 26.

In the shown embodiment, the sanitary management system 1 furthermore comprises at least one basic sensor 3 with which at least one operating value of the at least one sanitary installation is recorded. In other embodiments of the invention, the at least one basic sensor 3 can also be left out or serve as additional sensor(s). In these cases, at least one operating value of the sanitary installation, such as their switch cycles, their water consumption or the like, can be recorded directly on the at least one sanitary installation or by means of an electronic control device provided thereon, or the respective sanitary installation can deliver its own operating values.

In the depicted specific embodiment, further facility technology 4, which can for example comprise a light control 41 and/or a door control 42 of one or several rooms of a building is additionally part of the sanitary facility management system 1. In other embodiments of the present invention, the further facility technology 4 can also not be part of the sanitary facility management system.

One or several additional sensor(s) 5 such as motion or presence detectors is/are provided on the corresponding facility technology 4, with which operating data of the facility technology 4, such as switching data of the light control 41 and/or access data of the door control 42, are recorded.

In the shown specific embodiment, at least one user 6 of the at least one sanitary installation is furthermore involved in the sanitary facility management system 1. User data of the at least one user 6, such as a number of the users 6 using the at least one sanitary installation, their age, gender and/or mood can be recorded. Furthermore, a user feedback can be made by the at least one user 6, which can also be included in the user data. In other embodiments of the present invention, user are not involved in the sanitary facility management system.

In the shown specific embodiment, the sanitary facility management system 1 also comprises at least one further data source 7. Such further data sources 7 can for example be schedules, programmes, timetables, flight schedules, opening hours, weather forecast reports or the like. Prediction data can be deduced from the at least one further data source 7. Thus, a programme of a theatre can for example be used to determine, when a play is running and when an intermission happens. For example, if the intermission has ended and a toilet flush is continuously running, this can be an indication for a malfunction of the respective toilet. In other embodiments of the present invention, the respective sanitary facility management system can also not comprise any further data sources.

In the shown example, the respective data, that is the operating values 31 of the at least one sanitary installation, the optionally recorded operating data 51 of the facility technology 4, the optionally recorded user data 61 of the at least one user 6 and the optionally recorded forecast data 71 of the at least one further data source 7, hereinafter summarized as data, are transmitted to a data processing and signal output system 9 of the sanitary facility management system 1 by at least one data transmitter 8.

In the shown embodiment, the data processing and signal output system 9 is a computer but can also be a smartphone, a cloud or a facility management system or a combination of these possibilities in other embodiments of the present invention.

The transferred data are processed in the data processing and signal output system 9. In the shown embodiment, a formation of an installation model thereby takes place. Algorithms of the artificial intelligence are used with this installation model formation. The installation model formation makes it possible to deduce usage scenarios from the transmitted data and/or to make a correlation between the operating values of different sanitary installations of the sanitary facility 2 and/or to identify interactions between different elements of the sanitary facility 2, for example between the water supply and the at least one sanitary installation.

In the depicted example, the installation model formed of the data processing and signal output system 9 includes the water supply, the at least one sanitary installation and thus the at least one water consumer, the influence of the further facility technology 4, the influence of the users 6 and the forecast data 71 as well as the interactions between those elements.

Based on the installation model, the data processing and signal output system 9 deduces decisions and/or suggestions for further proceeding. This can include a prediction of usage situations and/or an optimization of operating parameters of the sanitary facility 2, such as an optimization of the water consumption or the consumption of other media and/or an optimization of the user experience and/or an optimization of the service on the sanitary facility 2. With the data processing and signal output system 9, actions can furthermore be actively initiated. The data processing and signal output system 9 can furthermore give at least one piece of information to the user(s) 6 and/or a facility management and/or at least one plumber.

The decisions of the data processing and signal output system 9 are transferred in the form of at least one signal 91 from the data processing and signal output system 9 to at least one signal receiver 10 of the sanitary facility control device. Thereupon, the sanitary facility control device initiates at least one action on the sanitary facility 2 and/or changes at least one operating parameter of the sanitary facility 2. Such an action can for example be a flush release and/or a cleaning stop and/or a switch-off of the water supply and/or a thermal disinfection and/or an activation of an illumination and/or another sanitary installation-specific action. Changeable operating parameters of the sanitary facility 2 can for example be a flush quantity and/or a sensitivity and/or a maximum duration and/or a discharge and/or a pressure and/or a water temperature and/or a time schedule and/or another parameter of the at least one sanitary installation.

The at least one action and/or the at least one operating parameter change has immediate effect on the sanitary facility 2.

FIG. 2 schematically shows another embodiment of the sanitary facility management system 1*a* according to the invention. The sanitary facility management system 1*a* is a leakage protection system based on a meshed communication.

The sanitary facility management system 1*a* includes several sanitary installations, such as a shut-off valve 26, a urinal 21, a washbasin tap 23, a toilet 25 and a shower 22. Each of the sanitary installations comprises its own electronic control device 11. Each of the sanitary installations is furthermore connected to each of the other sanitary installations via a data communication, wherein data can be reciprocally transferred from one sanitary installation to another, respectively. Thus, the sanitary installations form a meshed network, which herein serves as a data processing and signal output system.

In the shown embodiment, a flow measurement device 12 is provided on the shut-off valve 26, with which at least one flow of water through the shut-off valve 26 is measured. The flow measurement device 12 is furthermore connected to the electronic control device 11 of the shut-off valve 26. Thus, the electronic control device 11 of the shut-off valve 26 not only receives data from the flow measurement device 12, but also from all other sanitary installations of the sanitary facility management system 1*a*. Accordingly, the electronic control device 11 of the shut-off valve 26 can use operating data of the other sanitary installations in addition to the operating values of the shut-off valve 26 measured with the flow measurement device 12 in order to thus identify and learn typical usage scenarios. The sanitary facility management system 1*a* thus provides intelligent leakage detection. Thus, it is easier to identify fault situations with the sanitary facility management system 1*a* compared to conventional leakage protection systems, which only work based on a flow measurement and/or other data from a water supply, such as a water pressure, and which determine faulty situations and stop water supply based on simple rules, such as fixed limits for the amount of water, discharge and water abstraction duration.

Multiple sanitary facility management systems 1*a* can be provided in a building. A cascaded leakage protection can for example be formed by means of several of the sanitary facility management systems 1*a* in a water supply line and for each floor or room. Thereby, the data of several sanitary facility management systems 1*a* can be compared to each other.

FIG. 3 shows a general process of a sanitary facility management method according to the invention for leakage protection by means of the schematically depicted sanitary facility management system 1*b*. The depicted general process applies to the mesh network in FIG. 2 as well.

In the sanitary facility management system 1*b*, a flow characteristic 121 is recorded by a flow measurement device 12 located in a water supply line 13; a flow through the water supply line 13 is for example measured. Instead of the flow measurement device 12, a pressure gauge or other sensors can alternatively be used in the water supply line 13 for determining the flow characteristic 121, such as a water amount, a flow profile or a pressure of the water supply line 13.

The water supply line 13 supplies water to the sanitary installations of a sanitary facility 2. In the shown example, the sanitary facility 2 comprises several sanitary installations, such as a urinal 21, a shower 22, a washbasin tap 23, a bathtub 24 and a toilet 25. Of these sanitary installations, operating values 31 are recorded by at least one basic sensor 3 in the shown example. As mentioned above, the at least one basic sensor 3 can also be left out or serve as an additional sensor in other embodiments. The controls of the individual sanitary installations then generate their own operating values.

Further facility technology 4 is additionally part of the sanitary facility management system 1*b* in the depicted embodiment, which can for example comprise a light control 41 and/or a door control 42 of one or several rooms of a building. The further facility technology 4 does not need to be a part of the respective sanitary facility management system in other embodiments.

One or several additional sensor(s) 5 is/are provided on the corresponding facility technology 4, such as motion or presence detectors, with which operating data of the building technology 4, such as switching data of the light control 41 and/or access data of the door control 42, are recorded.

The data of the flow characteristic 121, the operating values 31 and the optionally recorded operating data 51 are transmitted to a data processing and signal output system 9 by at least one data transmitter 8. The data processing and signal output system 9 develops an installation model from the received data or compares the received data to a pre-existing installation model, and checks, whether rules of this installation model are violated and/or refines a pre-existing installation model by means of the received data.

Basic rules are included in this installation model. Such basic rules for example include limits such as a maximum discharge through the water supply line 13 for detecting a burst pipe and/or rules for correlation between discharge and consumption characteristic.

In the shown example, the installation model is refined based on a discharge and consumption profile, a user feedback and operating data 51. This refinement can for example include an identification of typical user scenarios and/or an identification of unconnected sanitary installations or other water consumers and/or a refinement of the correlation between discharge and consumption characteristic and/or an establishment of rules for predicting certain scenarios by evaluating historical discharge and consumption data and identifying of typical scenarios.

The installation model is hereby able to detect defects and/or an unusual usage behavior based on rules.

After the receipt of the data, it is being checked in the processing and signal output system 9 whether the rules of the installation model are violated. If so, the data processing and signal output system 9 sends a signal to a signal receiver 10 of a sanitary facility control device for closing a shut-off valve 26. After receiving a user confirmation by the user 6, it is queried whether there is a defect in a water supply line and/or in a water outflow line. If not, then it might have only been a false alarm and the shut-off valve 26 is opened again. If so, the shut-off valve 26 remains closed and a notification is issued to a person in charge. These pieces of information are also transmitted to the installation model for its further refinement.

FIGS. 4 to 8 schematically show possible communication structures between the individual sanitary installations and the correspondingly used data processing and signal output system principle usable with the present invention. For the sake of simplicity, the respective basic sensors, data transmitters and signal receivers were left out in the depictions.

FIG. 4 schematically shows a communication structure usable with one embodiment of the sanitary facility management system 1*c* according to the invention, based on a meshed network. Similar to FIG. 2, different sanitary installations, such as a urinal 21 with the corresponding electronic control device 11, a shower 22 with the corresponding electronic control device 11, a washbasin tap 23 with the corresponding electronic control device 11, and a toilet 25 with the corresponding electronic control device 11 are herein communicating with each other in a network, wherein the data channels situated between the individual sanitary installations respectively, each enable a reciprocal communication between the sanitary installations.

FIG. 5 schematically shows a communication structure usable with one embodiment of the sanitary facility management system 1*d* according to the invention with a cloud 92 communicating with a computer 93 and/or a mobile device 94, such as a smartphone or a tablet, as a data processing and signal output system 9. The cloud 92 is an IT infrastructure available via the internet. In the shown embodiment, the cloud 92 communicates with several sanitary installations each comprising an electronic control device 11, such as a washbasin tap 23, a urinal 21, a toilet 25 and a shower 22.

FIG. 6 schematically shows a communication structure usable with one embodiment of the sanitary facility management system 1*e* according to the invention, in which a gateway is provided as a data and/or signal intermediate processing facility 14 between sanitary installations each comprising an electronic control device 11, such as a washbasin tap 23, a urinal 21, a toilet 25 and a shower 22 and a facility management system, serving as a data processing and signal output system 9. The connection between the sanitary installations and the gateway herein takes place via radio communication.

FIG. 7 schematically shows a communication structure usable with one embodiment of the sanitary facility management system if according to the invention with a gateway and a data processing and signal output system 9 consisting of several components. Similar to the sanitary facility management system 1*d* in FIG. 5, the data processing and signal output system 9 herein consists of a cloud 92 as a data processing and signal output system 9 communicating with a computer 93 and/or a mobile device 94. The cloud 92 is an IT infrastructure available via the internet. In the shown embodiment, the cloud 92 communicates with the gateway acting as a data and/or signal intermediate processing device 14 as well as with the computer 93 and/or the mobile device 94. In turn, the gateway respectively communicates reciprocally with several sanitary installations each comprising an electronic control device 11 shown only exemplarily, such as a washbasin tap 23, a urinal 21, a toilet 25 and a shower 22 via a radio connection.

FIG. 8 schematically shows a communication structure usable with one embodiment of the sanitary facility management system 1*g* according to the invention with a gateway acting as a data and/or signal intermediate processing device 14 and several devices of a data processing and signal output system 9. In the shown example, the gateway communicates reciprocally with each of the several sanitary installations, each comprising an electronic control device 11 shown only exemplarily, such as a washbasin tap 23, a urinal 21, a toilet 25 and a shower 22 via a radio connection. Furthermore, the gateway communicates with a computer 93 and/or a mobile device 94. Thereby, both the computer 93 and the mobile device 94 belong to the data processing and signal output system 9.

FIG. 9 schematically shows a simple communication structure usable with one embodiment of the sanitary facility management system 1*h*. With this communication structure, several sanitary installations each comprising an electronic control device 11 shown only exemplarily, such as a washbasin tap 23, a urinal 21, a toilet 25 and a shower 22, communicate with a mobile telephone acting as a data processing and signal output system 9.

The invention claimed is:

1. A sanitary facility management system comprising:

a plurality of sanitary installations each coupled to a common water supply line and configured to record operating data;

a flow measurement device configured to record a flow characteristic of the common water supply line;

a shut-off valve disposed in the common water supply line;

a sanitary facility control device connected to the plurality of sanitary installations and comprising at least one data transmitter and at least one signal receiver; and a data processing and signal output system in communication with the sanitary facility control device via the at least one data transmitter and the at least one signal receiver, wherein:

(i) the operating data of the plurality of sanitary installations and the flow characteristic are transmitted to the data processing and signal output system;

(ii) the data processing and signal output system forms and updates an installation model based on at least one of: the operating data, or the flow characteristic;

(iii) the installation model includes correlations between:

(a) operating data of different sanitary installations, and (b) operating data of the plurality of sanitary installations and the flow characteristic of the common water supply line to define a discharge and consumption profile of the sanitary facility;

(iv) based on the discharge and consumption profile, the data processing and signal output system determines whether a detected discharge or consumption condition violates one or more correlation rules of the installation model; and (v) when the data processing and signal output system determines that the detected discharge or consumption condition violates the one or more correlation rules, the data processing and signal output system transmits a control signal to close the shut-off valve, wherein the data processing and signal output system updates the installation model based on at least the determined violation.

2. The sanitary facility management system of claim 1, wherein the flow characteristic comprises at least one of a water amount, a flow profile, or a pressure in the common water supply line.

3. The sanitary facility management system of claim 1, wherein the one or more correlation rules of the installation model include at least one of: (i) a maximum discharge through the common water supply line for detecting a burst pipe, or (ii) a rule defining a correlation between discharge and consumption characteristic.

4. The sanitary facility management system of claim 1, wherein, after the control signal is transmitted to close the shut-off valve, the data processing and signal output system requests and receives a user confirmation indicating whether a fault is present and, in response to the user confirmation indicating no fault, transmits a control signal to open the shut-off valve and, in response to the user confirmation indicating a fault, maintains the shut-off valve closed and issues a notification, wherein the user confirmation is received via an input device at the sanitary facility for confirming errors or false alarms, and wherein the user confirmation indicates whether there is a defect in a water supply line and/or in a water outflow line.

5. The sanitary facility management system of claim 1, wherein the installation model is refined based on at least one of (i) user feedback, or (ii) operating data from facility technology outside the sanitary installations.

6. The sanitary facility management system of claim 1, wherein the data processing and signal output system is a computer or a mobile device with computer functionality and connectivity or an IT infrastructure available via the internet or a facility management system.

7. The sanitary facility management system of claim 1, wherein a data and/or signal intermediate processing device is provided between (i) the at least one data transmitter and the data processing and signal output system and/or (ii) the at least one signal receiver and the data processing and signal output system.

8. The sanitary facility management system of claim 1, wherein the data processing and signal output system is a meshed network comprising at least one basic sensor or an electronic control of one of the sanitary installations and at least one network sensor communicating with the at least one basic sensor or the electronic control of another of the sanitary installations.

9. The sanitary facility management system of claim 1, wherein the data processing and signal output system generates the control signal based on at least one regulation and/or a classifier trained with methods of artificial intelligence, and wherein the data processing and signal output system automatically groups the operating data and the flow characteristic into correct and error-indicating data in comparison to the one or more correlation rules of the installation model.

10. The sanitary facility management system of claim 1, wherein the data processing and signal output system receives data from at least one of (i) a water supply of the sanitary facility or (ii) a waste water disposal of the sanitary facility, and processes the received data for generating the control signal.

11. A sanitary facility management method comprising:

recording operating data from each of a plurality of sanitary installations coupled to a common water supply line;

recording, by a flow measurement device, a flow characteristic of the common water supply line;

transmitting the operating data and the flow characteristic to a data processing and signal output system;

forming and updating, by the data processing and signal output system, an installation model based on at least the operating data and the flow characteristic, wherein the installation model includes correlations between:

(i) operating data of different sanitary installations, and (ii) operating data of the sanitary installations and the flow characteristic of the common water supply line to define a discharge and consumption profile of the sanitary facility;

determining, based on the discharge and consumption profile, whether a detected discharge or consumption condition violates one or more correlation rules of the installation model;

when the detected discharge or consumption condition violates the one or more correlation rules, transmitting a control signal to close a shut-off valve disposed in the common water supply line; and updating the installation model based on at least the determined violation.

12. The sanitary facility management method of claim 11, wherein the flow characteristic comprises at least one of a water amount, a flow profile, or a pressure in the common water supply line.

13. The sanitary facility management method of claim 11, wherein the one or more correlation rules of the installation model include at least one of: (i) a maximum discharge through the common water supply line for detecting a burst pipe, or (ii) a rule defining a correlation between discharge and consumption characteristic.

14. The sanitary facility management method of claim 11, further comprising, after transmitting the control signal to close the shut-off valve, requesting and receiving a user confirmation indicating whether a fault is present and, in response to the user confirmation indicating no fault, transmitting a control signal to open the shut-off valve and, in response to the user confirmation indicating a fault, maintaining the shut-off valve closed and issuing a notification, wherein the user confirmation is received via an input device at the sanitary facility for confirming errors or false alarms, and wherein the user confirmation indicates whether there is a defect in a water supply line and/or in a water outflow line.

15. The sanitary facility management method of claim 11, further comprising refining the installation model based on at least one of (i) user feedback, or (ii) operating data from facility technology outside the sanitary installations.

16. The sanitary facility management method of claim 11, wherein the data processing and signal output system comprises a computer or a mobile device with computer functionality and connectivity or an IT infrastructure available via the internet or a facility management system.

17. The sanitary facility management method of claim 11, wherein a data and/or signal intermediate processing device is provided between (i) a data transmitter transmitting the operating data and/or the flow characteristic and the data processing and signal output system and/or (ii) a signal receiver receiving the control signal and the data processing and signal output system.

18. The sanitary facility management method of claim 11 wherein the data processing and signal output system is a meshed network comprising at least one basic sensor or an electronic control of one of the sanitary installations and at least one network sensor communicating with the at least one basic sensor or the electronic control of another of the sanitary installations.

19. The sanitary facility management method of claim 11, further comprising:

generating the control signal based on at least one regulation and/or a classifier trained with methods of artificial intelligence, and automatically grouping the operating data and the flow characteristic into correct and error-indicating data in comparison to the one or more correlation rules of the installation model.

20. The sanitary facility management method of claim 11, further comprising receiving, by the data processing and signal output system, data from at least one of (i) a water supply of the sanitary facility or (ii) a waste water disposal of the sanitary facility, and processing the received data for generating the control signal.

* * * * *